United States Patent [19]
Bodas et al.

[11] Patent Number: 5,854,914
[45] Date of Patent: Dec. 29, 1998

[54] MECHANISM TO IMPROVED EXECUTION OF MISALIGNED LOADS

[75] Inventors: Milind Bodas, Santa Clara, Calif.; Glenn J. Hinton, Portland; Andrew F. Glew, Hillsboro, both of Oreg.

[73] Assignee: Intel Corporation, Santa Clara, Calif.

[21] Appl. No.: 711,096

[22] Filed: Sep. 10, 1996

Related U.S. Application Data

[63] Continuation of Ser. No. 603,124, Feb. 13, 1996, abandoned.

[51] Int. Cl.⁶ ..................................................... G06F 9/30
[52] U.S. Cl. ......................... 395/392; 395/376; 395/561; 395/566; 395/380
[58] Field of Search ..................................... 395/411, 376, 395/800, 425, 750.01, 750.035, 561, 566, 380; 364/200

[56] References Cited

U.S. PATENT DOCUMENTS

| | | | |
|---|---|---|---|
| 4,959,779 | 9/1990 | Weber et al. | 364/200 |
| 5,063,497 | 11/1991 | Cutler et al. | 395/800 |
| 5,125,083 | 6/1992 | Fite et al. | 395/411 |
| 5,247,635 | 9/1993 | Kamiya | 395/425 |
| 5,386,531 | 1/1995 | Blaner et al. | 395/425 |
| 5,420,990 | 5/1995 | McKeen et al. | 395/411 |
| 5,497,468 | 3/1996 | Tani et al. | 395/376 |
| 5,526,510 | 6/1996 | Akkary et al. | 395/460 |
| 5,577,200 | 11/1996 | Abramson et al. | 395/185.03 |
| 5,708,843 | 1/1998 | Abramson et al. | 395/800.23 |

OTHER PUBLICATIONS

M. Johnson, *Superscalar Microprocessor Design*, P.T. R. Prentice–Hall, Inc. (1991).

*Primary Examiner*—Parshotam S. Lall
*Assistant Examiner*—Saleh Najjar
*Attorney, Agent, or Firm*—Jeffrey S. Draeger

[57] ABSTRACT

A method and apparatus for executing a misaligned load. The method begins with receiving a load request to load data from a first memory location. An entry in a store buffer is tested to determine whether the entry corresponds to the first memory location. The entry is also tested to determine whether the entry corresponds to a second memory location subsequent to the first memory location. The load request is blocked if the entry corresponds to the first memory location or the second memory location. After a store operation for the store buffer entry is executed, the load request may be unblocked. The apparatus is a processor or a computer system comprising a load buffer capable of storing a load request address in response to a load request. The processor includes an incrementing circuit that generates an incremented load request address. The processor also includes a store buffer containing a portion of a store request address. The store buffer includes comparison circuitry that compares the portion of the store request address to the load request and the incremented load request address, and generates a blocking signal if the either of the load request address and the incremented load request correspond to the store request address.

26 Claims, 5 Drawing Sheets

MECHANISM TO IMPROVED EXECUTION OF MISALIGNED LOADS

This is a continuation of the Application with Ser. No. 08/603,124, filed on Feb. 13, 1996 that is now abandoned.

FIELD OF THE INVENTION

The present invention pertains to the field of computer systems. More specifically, the present invention relates to the execution of misaligned load requests in computer systems.

BACKGROUND

Processors are often optimized to operate on a certain instruction or operand size, sometimes sacrificing performance of code written using previous, smaller instructions or operands. The memory execution unit (MEU) is one portion of a processor which is typically optimized for aligned memory accesses of up to a certain fixed number of bits. A segment of memory of the fixed number of bits starting at an address evenly divisible by that number is referred to herein as a "chunk".

The memory execution unit can use store buffers to bolster performance by freeing the processor to continue execution of other instructions without waiting for the completion of memory store operations. In a processor utilizing store buffers, returning correct data for a load operation depends on checking the store buffer for address conflicts. If split store operations (stores accessing two chunks) are buffered, an extra conflict check must be performed. A buffered split store can conflict with a load accessing a first memory chunk which includes the store address or a second consecutive chunk into which the store is split. This second conflict can be detected by comparing a decremented load address to the addresses in the store buffer. If an address conflict is detected, the load operation is blocked and the processor is unable to complete the blocked load until the blocking buffered store(s) are executed. The load operation is unblocked and executed after completion of the conflicting store(s).

Address conflict checks can be performed using physical or virtual addresses. Typically, the physical and virtual addresses have a common portion which is a page offset and does not require translation. Depending on the particular system, better performance could be obtained with address conflict checks comparing only page offset bits of the virtual and physical addresses. This would allow the checks to be performed before the virtual address translation of the load operation is completed. While some of the loads will be unnecessarily blocked, there could be a net performance gain since the address conflicts are detected earlier.

In an out-of-order execution computer system, circuitry such as a memory order buffer (MOB) coordinates the load and store requests from the execution unit(s). Not all buffered store requests risk conflict with a load request since some buffered store operations may be program steps subsequent to the load. For example, the youngest conflicting buffered store operation may not precede the memory load operation. Thus, detecting conflicts in an out-of-order system is more difficult because the store operations do not inevitably block all loads with conflicting addresses.

In either an out-of-order execution system or an in-order execution system, the memory execution unit and the store buffers are typically optimized for aligned chunks. For example, the memory order buffer (MOB) may be optimized for a data bus width of W bits. A MOB split occurs when an access requires data from two contiguous W bit chunks of memory. That is, a MOB split spans an address divisible by W.

One approach used to deal with MOB splits in the context of a processor having store buffers is to block all misaligned accesses which are MOB split loads. An out-of-order system utilizing this approach is described in U.S. patent application Ser. No. 08/177,164 now U.S. Pat. No. 5,724,536 entitled "Method and Apparatus for Performing Load Operations in a Computer System." This approach is used because a conflict with a MOB split load can not be detected with a single address comparison against the W bit store buffers. Unfortunately, blocking all MOB split loads degrades performance for software written with shorter instructions and/or compiled without aligning opcodes and data with chunk boundaries. The performance suffers because misaligned opcodes and data are likely to span chunk boundaries, causing many split cycles and consequently many blocked loads.

Thus, prior art processors are unable to selectively block misaligned loads in a processor having a store buffer. Additionally, prior art out-of-order execution processors are unable to selectively block split loads and consequently do not allow speculative execution of non-conflicting split loads. These prior processors do not deliver maximum possible performance for existing software which is not optimized for the instruction or chunk size of the processor.

SUMMARY

A method of executing a misaligned load begins by receiving a load request to load data from a first memory location. An entry in a store buffer is tested to determine whether the entry corresponds to the first memory location. The entry is also tested to determine whether the entry corresponds to a second memory location subsequent to the first memory location. The load request is blocked if the entry corresponds to the first memory location or if the entry corresponds to the second memory location and the load request is a misaligned load request. After a store operation for the store buffer entry is executed, the load request may be unblocked.

A processor which performs this method comprises a load buffer containing an entry which includes a load request address received in conjunction with a load request. The processor includes an incrementing circuit that generates an incremented load request address. The processor also includes a store buffer containing a portion of a store request address. The store buffer includes comparison circuitry that compares the portion of the store request address to the load request address and the incremented load request address and generates a blocking signal if the store request address corresponds to the load request address or the incremented load address request. The circuitry for comparing may comprise content addressable memories. By selectively blocking conflicting misaligned loads, the processor allows speculative execution of non-conflicting misaligned loads.

BRIEF DESCRIPTION OF THE FIGURES

The present invention is illustrated by way of example and not limitation in the figures of the accompanying drawings.

DETAILED DESCRIPTION

The present invention provides a mechanism to improve execution of misaligned loads. In the following description, numerous specific details are set forth such as particular data bus, flag, and buffer sizes in order to provide a thorough understanding of the present invention. It will be appreciated, however, to one skilled in the art that the present invention may be practiced without such specific details. In other instances, control structures and gate level circuits have not been shown in detail in order not to obscure unnecessarily the present invention. Those of ordinary skill in the art, with the described functions, will be able to implement the necessary logic circuits without undue experimentation.

Figure 1:
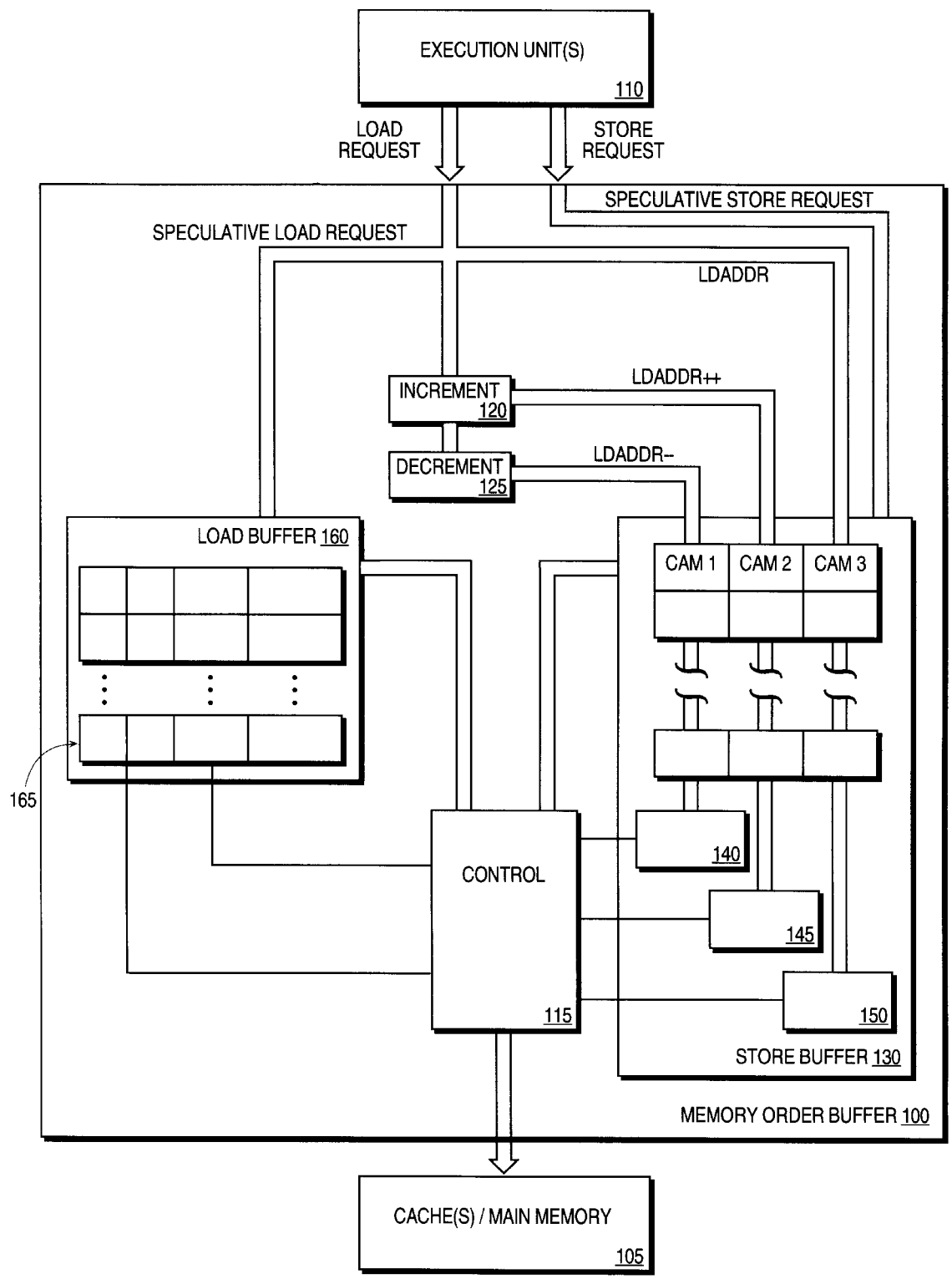
FIG. 1 is a block diagram representation of a computer system utilizing the present invention.

FIG. 1 shows several important components in a computer system utilizing the present invention. At least one execution unit 110 accesses memory by dispatching load requests and store requests to a memory order buffer (MOB) 100. While many memory accesses originate from an execution unit reservation station, load requests entering the MOB may originate from a variety of sources. For example, a load cycle may also be selected through arbitration logic (not shown) from load buffers, an address generation unit, or as bypasses from certain stages of the execution pipeline.

The present invention may be used in a variety of processing systems having an execution unit which requests loads and stores from a memory system 105. The present invention may be particularly advantageously employed in a system allowing speculative out-of-order execution of instructions. For example, the present invention may be used as an improvement to the system described in the previously referenced patent application Ser. No. 08/177,164 now U.S. Pat. No. 5,724,536.

The memory order buffer (MOB) 100 orchestrates the execution of load and store requests from the execution unit(s). In this embodiment, the memory system 105 comprises at least one cache and a main memory. The MOB and various buffers therein will typically be optimized for a particular data width (W), often corresponding to a W bit data bus shared with the main memory and/or a cache. Memory accesses to addresses which are not divisible by W are considered to be misaligned. If a misaligned access is wide enough to span an address divisible by W, the access is called a split access because it requires access to two consecutive chunks of memory. A MOB split crosses chunk boundaries within a cache line, as opposed to cache line and page splits which respectively cross cache line and page boundaries as well as chunk boundaries.

Store requests from the execution unit are received by a store buffer 130. In one embodiment, twelve entries are arranged as a circular queue which maintains a tail pointer and a wrap around bit. Each entry stores an associated store buffer identification (SBID). In this embodiment, each entry requires storage for several other fields. A store data buffer (SDB) and a physical address buffer (PAB) respectively store the store data and bits 38:12 of the physical address associated with the store. The store address buffer (SAB) stores an opcode, the linear address (LA[31:0]), and a number of control and state flags, including an all blocking bit (Ab), a split bit (s), a valid bit (v), an address store instruction (STA) execution state bit (Ae), a store byte mask, and a data store instruction (STD) execution state bit (De).

These bits are set by the MOB depending on the details of the memory accesses requested by the execution units. The Ae and De bits indicate whether a particular store instruction remains in at least a speculatively executed state. That is, whether the execution units still require this store operation. Depending on the type of store indicated by the opcode, the store may remain in the buffer for "background" execution when the memory system is available. Other store operations such as I/O writes are recognized by the MOB and are not executed in this background mode.

The all-blocking bit indicates that all younger loads should be blocked and that the data from this buffered store should not be forwarded to subsequent load operations. The split bit indicates whether the store contains data requiring a split store to be executed. The valid bit simply tracks whether the buffered store request remains a validly requested store. Depending on the particular details of the execution unit interfacing with the MEU, these and/or other similar bits may be necessary to track store operations from execution unit dispatch to retirement.

As shown in FIG. 1, the store buffer has three content addressable memories (CAMs), CAMN, CAM2, and CAM3, having associated match detection circuitries 140, 145, and 150. These content addressable memories can be any type of content addressable memory such as those commonly used for tag matching in caches or translation look-aside buffers. Each content addressable memory of one embodiment stores address information corresponding to bits 11:0 of up to 12 store requests and allows parallel comparison of all entries to a portion of a load request address. Any circuitry devised to perform such comparisons could be used. Even a single CAM or other circuit could be used to sequentially performs these comparisons.

The match detection circuitries of the CAMs provide blocking signals to control circuitry 115 when the CAM detects a match. In one embodiment, only page offset bits are stored in the CAMs (e.g. bits 11:3 and byte masks for bits 2:0). Since these bits are identical for both the physical address and the linear address, address comparisons can be performed without waiting for an address translation to be completed. This allows earlier detection of blocking conditions, but also increases the number of loads which are unnecessarily blocked. In this embodiment, bits 2:0 are expanded into byte masks indicating which of the 8 possible bytes of the chunk are being accessed. As part of the match detection circuitry, a byte mask overlap detection circuitry detects whether there are any conflicting bytes.

The granularity at which address conflicts can be detected may be adjusted by trading off increased comparison and control circuitry for decreased numbers of unnecessarily blocked loads. In other words, differing levels of scrutiny may be applied to determine whether two addresses correspond. For example, the MOB just described utilizes the byte mask bits to determine whether individual byte accesses actually conflict. Alternately, fewer bits could be considered and all accesses to the same word, double-word or chunk could be deemed conflicting.

Further, instead of using only the linear address in the content addressable memory of the store buffers, the translated physical address could be compared. Such post-translation comparison would result in fewer unnecessarily blocked load requests; however, this is done at the expense of increasing the amount of content addressable memory in the store buffer.

Load requests received from the execution unit(s) are stored in an entry (e.g. entry 165) of a load buffer 160. This load buffer is implemented as a circular queue of 16 entries in one embodiment. Each entry includes a load request address which is received in conjunction with the load request from the execution unit(s). In one embodiment, the entry further comprises split, valid, and memory type bits, an opcode, block code bits, block indicating bits, and the linear address for the load. In this embodiment, the block code indicates the reason the particular load is blocked. For example, a load may be blocked as described herein due to a conflict with a pending store. A load may also be blocked for other reasons such as an incomplete address translation due to a miss in a translation look-aside buffer of the address generation unit. As will be further discussed below, the block indicating bits store pertinent unblocking (wakeup) information such as a SBID or an index into a fill buffer.

As well as being stored in the load buffer, the load request address is provided to CAM3, an incrementer 120, and a decrementer 125. The incrementer provides an incremented address derived from the load request address to CAM2. The incremented address is the address of the next aligned memory location after the load request. For one embodiment having a 64 bit chunk size, this means incrementing bits 11:3 of the load request address by 8 such that the incremented address corresponds to the chunk subsequent to the first chunk referenced by the load request. Similarly, the decrementer provides the previous aligned memory address to CAM1. By adjusting which bits are incremented and/or the amount, this approach can be adapted to systems having different data bus, chunk, and buffer widths.

Figure 2:
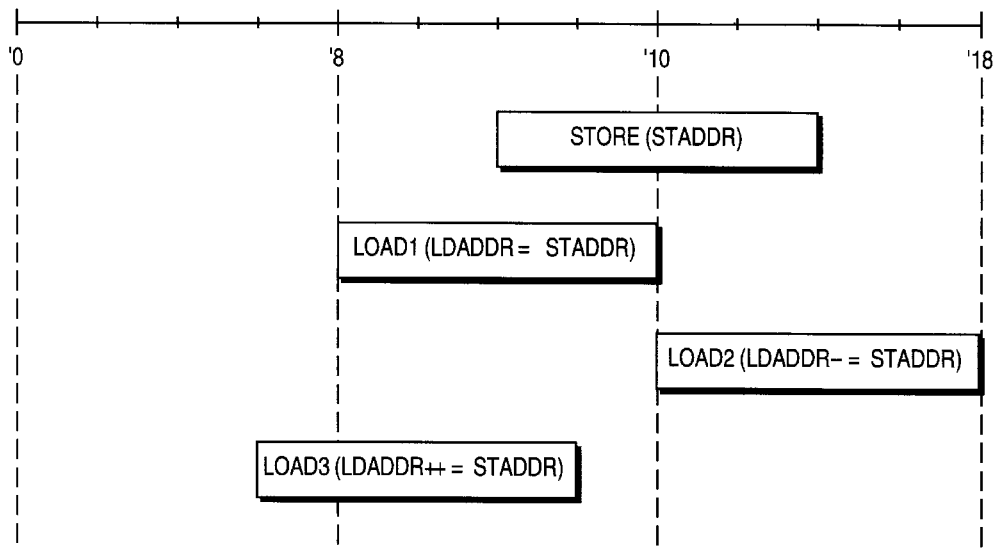
FIG. 2 is a diagram illustrating address conflicts between memory accesses.

An example of the load blocking conditions tested by CAM1–3 is illustrated in FIG. 2. The case of a split store is illustrated since it poses the most potential conflicts. The split store (STORE) conflicts with LOAD1 which refers to the same chunk of memory as the store. This condition is checked by providing the load request address to CAM3. The split store also-conflicts with LOAD2 which attempts to access the next aligned (with respect to chunk boundaries) memory location. This condition is checked by sending the decremented load request address to CAM1.

A processor of the present invention can also recognize conflicts with a misaligned load request such as LOAD3. This split store, as well as other split or non-split stores which access memory location '8 of this example, conflict with LOAD3. The system of the present invention employs CAM2 to detect address conflicts for split loads. Since split load detection is now possible, non-conflicting split loads can be executed in a more flexible sequence. This is highly advantageous because a misaligned load no longer needs to wait for the completion of all older stores.

In an alternate embodiment, the CAMs contain the store request address and incremented and decremented versions of the store address. In this embodiment, a portion of the load address is compared against each of the CAMs without being incremented or decremented. This embodiment eliminates the need to increment and/or decrement each load request address.

In the cases where a conflict is actually detected, all stores which are younger than the conflicting load must be executed prior to the load. In one embodiment, the entries in the load buffer are tagged with the SBID to identify the youngest store in the store buffer when the load is buffered. If the load is blocked, stores between the tail pointer, which points to the oldest valid store in the store buffer, and the load's SBID are executed. The load's SBID is used as a wakeup ID allowing the load to accurately complete after the youngest store prior to the load has been executed.

Figure 3:
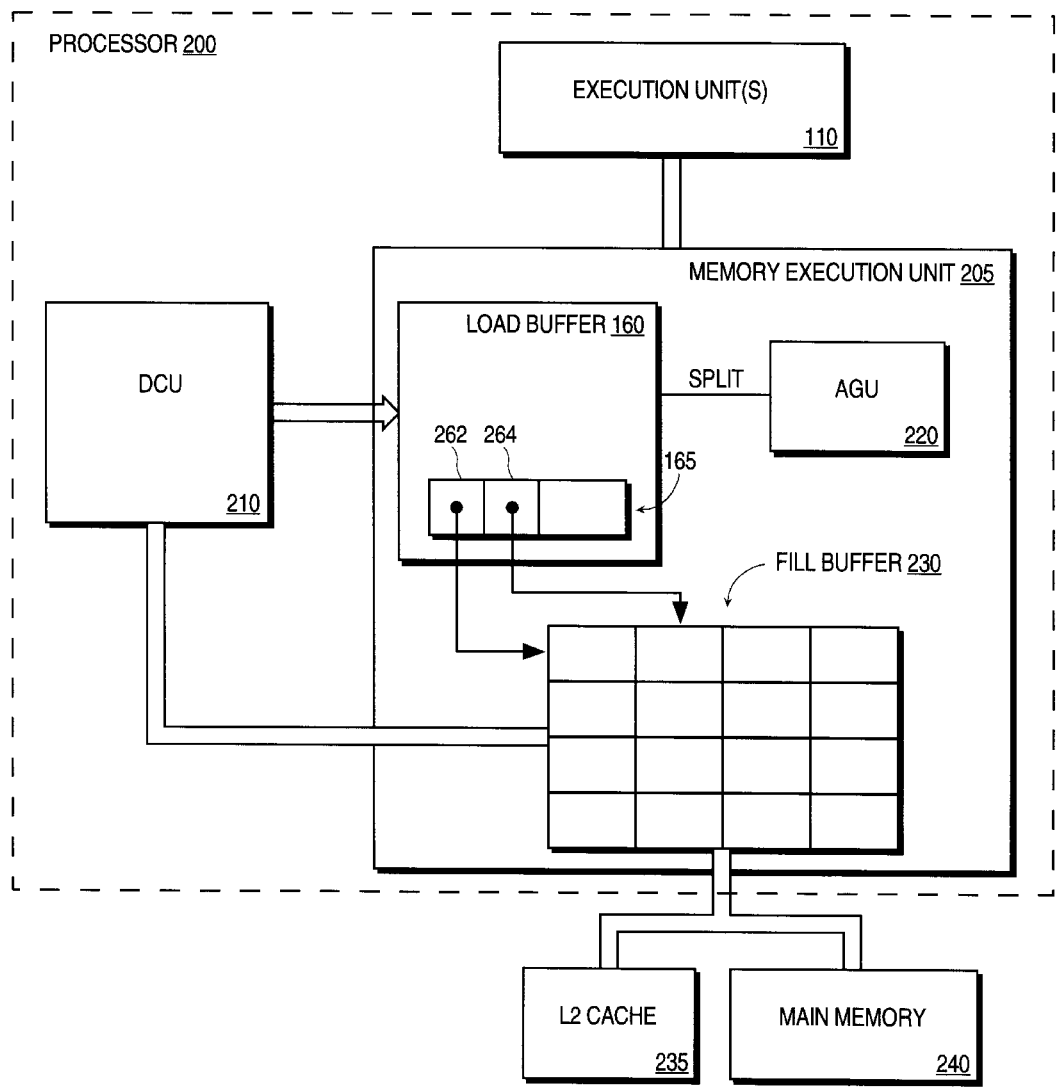
FIG. 3 is a block diagram further illustrating an embodiment of a computer system utilizing the present invention.

FIG. 3 shows additional details of the embodiment of FIG. 1. In this illustration, one embodiment utilizing a memory subsystem comprising an L2 cache 235 and a main memory 240. A processor 200 comprises a data cache unit (DCU) 210, at least one execution unit 110, and a memory execution unit 205 (MEU). The memory execution unit includes the load buffer 160, an address generation unit (AGU) 220, MOB control circuitry (not shown), and a fill buffer 230.

Memory subsystems and caches and are well known in the art and will not be described in further detail. Additionally, address generation units (AGUs) are widely used to translate virtual addresses into physical addresses. Such address generation units commonly detect and appropriately dispatch misaligned and split memory cycles.

The fill buffer 230 is essentially a buffer for loads which have not been satisfied by data from the DCU (i.e. were misses in the L1 cache of this system). This particular fill buffer has four entries, each entry capable of filling one cache line of the DCU.

An entire cache line is usually requested from the memory subsystem whenever any portion of that cache line is needed. A portion of the cache line may be forwarded to the execution unit(s) if the load data is needed immediately. Each cache line is stored in a fill buffer entry and written to the DCU when the DCU becomes available. Since the cache line is first stored in the fill buffer entry and then written to the DCU, data for some load requests not yet in the DCU may reside in the fill buffer.

When a load in the entry 165 of the load buffer 160 is not blocked by a store in the store buffer, the load is executed by the MOB control circuitry in the memory execution unit. If DCU hit occurs, the data can be returned from the DCU to the execution unit(s). If there is a DCU miss, the fill buffer is checked to determine whether the requested data has already been retrieved from the memory subsystem or is presently being requested by one of the entries in the fill buffer.

If a fill buffer request has not yet completed and the load request will be satisfied when the fill buffer request is completed (i.e. the fill buffer request encompasses the data requested by the load request), the load request can be squashed into the fill buffer request. Each non-split load request requests data which maps into one of the four chunks in the fill buffer entry. Thus, the load buffers store a first pointer 262 to the appropriate fill buffer entry (i.e. the row) and a second pointer comprising block indicating bits 264 identifying the proper chunk (i.e. the column) in the fill buffer entry. These pointers are then used to determine when the load request should be unblocked (awakened).

The block indicating bits are checked as the fill buffer entries are filled. When the data requested by the load is returned from the memory subsystem, the data can be forwarded to satisfy the load request. In one embodiment, the first and second pointers are stored using the four bits of the load buffer which also hold the SBID at other times.

The present invention also allows split loads not found in the DCU to be squashed into a pending fill buffer request. A split load requires data from two chunks of the fill buffer entry. The block indicating bits must be adjusted to wake up this misaligned load only when both chunks which contain requested data have been retrieved from the memory subsystem. Thus, for a split load (indicated by a split signal from the AGU), the block indicating bits are incremented to ensure that the load is properly awakened.

In one embodiment, each fill buffer entry comprises four chunks and each chunk is the same width as the data bus to the main memory (64 bits). The depth and widths of the fill buffer (4 entries with 256 data bits), the DCU (8 kilobytes), the load buffer (16 entries) and store buffer (12 entries by 64 data bits) are design choices which may be altered to achieve higher performance at the expense of added circuitry.

Figure 4A:
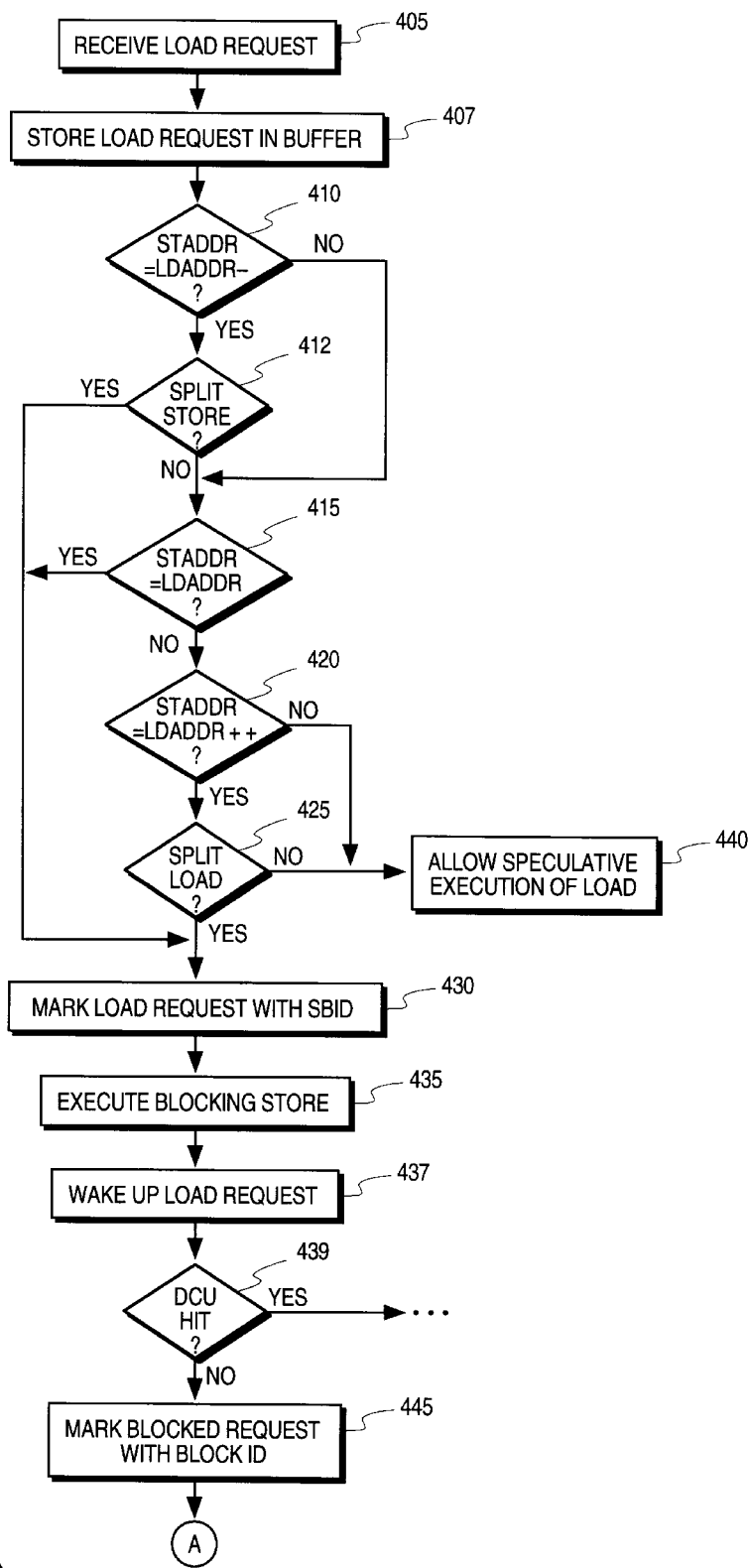
FIG. 4A is a flowchart for part of a method allowing speculative execution of misaligned loads.
Figure 4B:
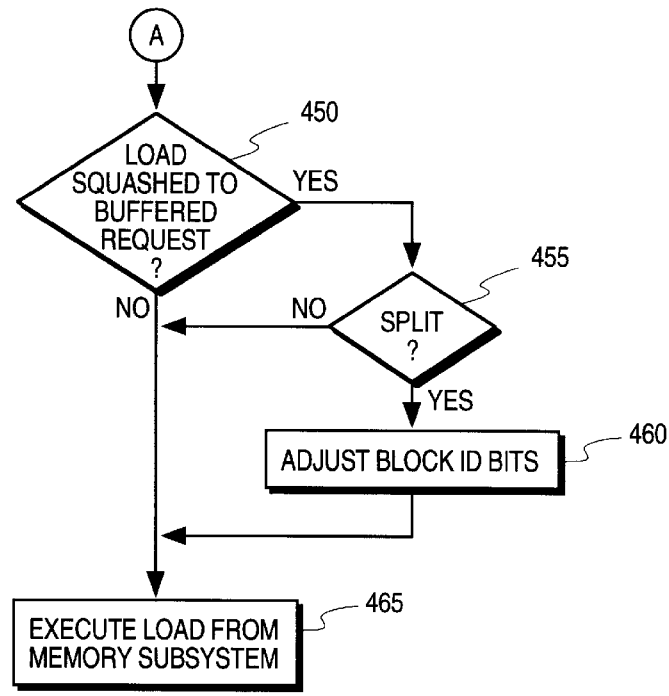
FIG. 4B is a flowchart completing the method allowing speculative execution of misaligned loads.

The steps in executing a misaligned load which is a MOB split are detailed in FIGS. 4A and 4B. In step 405, a load request is received by the MEU. The load request is then typically buffered in a load buffer (step 407); however, it should be noted that this may be done simultaneously with subsequent testing steps. Each store buffer entry is tested using steps 410, 412, 415, 420, and 425.

FIGS. 4A and 4B show one manner in which these conflict testing steps may be performed. The order of these tests is not crucial as long as the proper tests are performed. The testing steps may in fact be performed in parallel on each entry as well as in parallel on all entries of the store buffer. Other implementations could sequentially perform these tests to reduce overall hardware costs.

Further, as previously discussed, conflicting loads and stores of varying sizes can be detected by MOB control circuitry which analyzes the length of the load and store operations. Again, avoiding unnecessary blocking conditions by analyzing accesses to individual bytes within a chunk is done at the expense of increased comparison and control circuitry.

If the store address is equal to the decremented load address (step 410) and the store is a split store (step 412), then an address conflict exists. If the store address equals the load address (step 415) an address conflict can exist regardless of whether the load and/or store are split. If the store address is equal to the incremented load address (step 420), and the load is a MOB split (step 425), then an address conflict may exist. If no address conflict exists, the split load is allowed to execute speculatively (step 440). On the other hand, if an address conflict was found, the conflict must be resolved before the load can be executed.

For the blocked load, the load buffer is marked with the SBID of the youngest store at the time of the load request (step 430). Once the blocking store is executed (step 435), the load request is unblocked (awakened) in step 437, and the MEU attempts to satisfy the load request by a DCU lookup in step 439. If a DCU hit occurs, the data is returned from the cache. If the data requested is not found in the DCU, the request is filled using the fill buffer.

Accordingly, the load request is marked with a block identifier in step 445, indicating which chunk of the fill buffer will contain the data at the address requested. As previously discussed, the load may be squashed into another fill buffer entry. If the request is squashed (step 450, FIG. 4B), a split load must be specially treated. Upon detection of a split load (step 455), the block identification bits are adjusted (step 460) such that the load request is awakened only after step 465 wherein the data required for the load request has been retrieved from memory.

The step of marking the blocked request with the block identifier (step 445) could be performed at any time prior to the execution of the load from the memory system (step 465). In fact, these steps could be rearranged such that the load request is initially marked with properly adjusted block identification bits.

Thus, a computer system of the present invention provides improved execution of misaligned loads. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of executing a misaligned load comprising the steps of:

(a) receiving a load request to load data from a first memory location;

(b) testing an entry in a store buffer to determine whether the entry corresponds to either of the first memory location and a second memory location which is subsequent to the first memory location;

(c) blocking the load request if the entry corresponds to the first memory location, or if the entry corresponds to the second memory location and the load request is a misaligned load request.

2. The method of claim 1 wherein step (b) further comprises the step of:

testing a plurality of store buffer entries to determine whether any one of the plurality of store buffer entries corresponds to the first memory location or the second memory location.

3. The method of claim 2 wherein step (c) of blocking further comprises the step of:

blocking the load request if at least one of the plurality of store buffer entries corresponds to the first memory location or the second memory location.

4. The method of claim 1 further comprising the steps of:

(d) completing a store operation corresponding to the entry in the store buffer;

(e) unblocking the load request.

5. The method of claim 1 further comprising the step of:

(d) speculatively executing the load request if the entry does not correspond to the first memory location or the second memory location.

6. The method of claim 1 wherein the misaligned load request requests data in a first and a second chunk of memory, the entry in the store buffer contains data for the first chunk of memory, the first chunk corresponds to the first memory location, and the second chunk is consecutive to the first chunk and corresponds to the second memory location.

7. The method of claim 1 wherein step (c) further comprises the steps of:

(i) marking the load request as a blocked load request;

(ii) marking the load request with a store buffer ID for the entry in the store buffer.

8. The method of claim 1 wherein step (b) further comprises the steps of:

(i) providing a first address derived from the load request address to a first content addressable memory;

(ii) providing a second address derived from the load request address to a second content addressable memory;

(iii) determining whether the first address derived from the load request address corresponds to the first memory location using the first content addressable memory;

(iv) determining whether the second address derived from the load request address corresponds to the second memory location using the second content addressable memory.

9. The method of claim 8 wherein the first address derived from the load request address and the second address derived from the load request address are a portion of the load request address.

10. The method of claim 8 wherein the first address derived from the load request address is a portion of the load request address, and the second address derived from the load request address is a decremented version of the portion of the load request address.

11. The method of claim 4 further comprising the steps of:
   (f) buffering the load request in a fill buffer;
   (g) setting a wake up ID for the load request, the wake up ID indicating a chunk of the fill buffer.

12. The method of claim 11 further comprising the step of:
   (h) adjusting the wakeup ID stored with the load request such that the wakeup ID indicates an adjusted chunk of the fill buffer, the adjusted chunk being a second chunk of two chunks filled from memory to satisfy the load request.

13. A method of executing a load request comprising the steps of:
   (a) receiving a load request to load a value from a first memory location;
   (b) testing an entry in a store buffer to determine whether the entry corresponds to the first memory location;
   (c) testing the entry to determine whether the entry corresponds a second memory location prior to the first memory location;
   (d) testing the entry to determine whether the entry corresponds to a third memory location subsequent to the first memory location;
   (e) if the entry corresponds to the first memory location then blocking the load request;
   (f) if the entry corresponds to the second memory location and the entry is a misaligned store then blocking the load request;
   (g) if the entry corresponds to the third memory location and the load request is a misaligned load request then blocking the load request.

14. The method of claim 13 wherein the steps (b), (c), and (d) of testing are performed simultaneously for the load request.

15. The method of claim 13 wherein the step (d) of testing only blocks the load request if the load request is a split load request.

16. The method of claim 15 wherein the step (c) of testing only blocks the load request if the entry in the store buffer is a split store request.

17. A processor comprising:
   a load buffer capable of storing an entry comprising a load request address in response to a load request;
   an incrementing circuit that generates an incremented load request address;
   a store buffer containing a portion of a store request address and comprising comparison circuitry that compares the portion of the store request address to the load request address and the incremented load request address to generate a blocking signal if either of the load request address and the incremented load request address correspond to the store request address.

18. The processor of claim 17 wherein the load request address corresponds to a first chunk of memory and the incremented load request address corresponds to a consecutive chunk of memory.

19. The processor of claim 18 wherein the incrementer increments bits 11 through 3 of the load request address such that the incremented load request address refers to a chunk starting 8 bytes after the first chunk.

20. The processor of claim 17 wherein the store buffer further comprises:
   a first content addressable memory coupled to detect a match between the store request address and the load request address;
   a second content addressable memory coupled to the incrementing circuit to detect a match between the store request address and the incremented load request address.

21. The processor of claim 17 further comprising:
   a control circuit coupled to receive the blocking signal,
   wherein the load buffer entry further comprises a plurality of block indication bits, and
   wherein the control circuit is coupled to alter the plurality of block indication bits in response to a split signal.

22. The processor of claim 21 further comprising:
   a fill buffer having a fill buffer width of at least twice a chunk width,
   wherein the block indication bits indicate a chunk of the fill buffer, and
   wherein the control circuit is coupled to squash the load request into a pending fill buffer request if the pending fill buffer request encompasses data requested by the load request, and
   wherein the control circuit adjusts the chunk number for the block indication bits when the load request is a split load request, the chunk number being adjusted to indicate the last chunk to be read into the fill buffer necessary to complete the load request.

23. The processor of claim 21 wherein the chunk width is 64 bits, the fill buffer width is 256 bits, and the chunk number to be stored in the indication bits is incremented once due to the split load.

24. A processor comprising:
   a load buffer containing an entry received in conjunction with a load request, the entry comprising a load request address and a plurality of block indication bits;
   an incrementing circuit that generates an incremented load request address;
   a decrementing circuit that generates a decremented load request address;
   a store buffer containing a portion of a store request address, the store buffer comprising a first, second, and third content addressable memories that detect a conflict between the store request address and at least one of the load request address, the incremented load request address, and the decremented load request address, and generate a blocking signal if the conflict is detected;
   a control circuit coupled to receive the blocking signal and to alter said plurality of load block indication bits.

25. A processor comprising:
   means for storing a load request, the load request including a load request address;
   means for incrementing the load request address to generate an incremented address;
   means for storing a store request, the store request including a portion of a store request address;
   first means for comparing the store request address to the load request address and generating a blocking signal if the store request address matches the load request address;
   second means for comparing the store request address to the incremented address and generating the blocking signal if the store request address matches the incremented address.

26. The processor of claim 25 wherein the load request further comprises at least one block indication bit and the processor further comprises:
   control means for altering the at least one block indication bit responsive to a split signal.

* * * * *

UNITED STATES PATENT AND TRADEMARK OFFICE
CERTIFICATE OF CORRECTION

PATENT NO.    : 5,854,914                                        Page 1 of 1
DATED         : December 29, 1998
INVENTOR(S)   : Bodas et al.

It is certified that error appears in the above-identified patent and that said Letters Patent is hereby corrected as shown below:

Column 4,
Line 18, delete "CAMN" and insert -- CAM1 --.

Signed and Sealed this

Twenty-second Day of July, 2003

JAMES E. ROGAN
*Director of the United States Patent and Trademark Office*